Patented Sept. 3, 1935

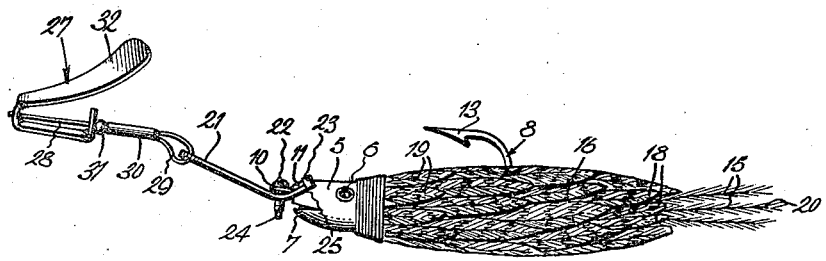
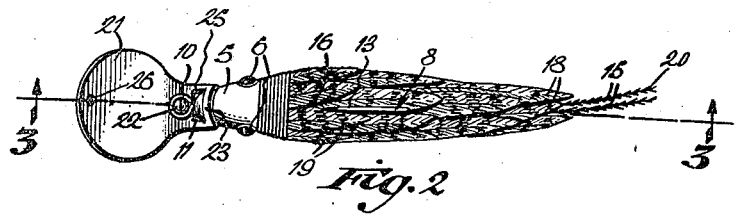
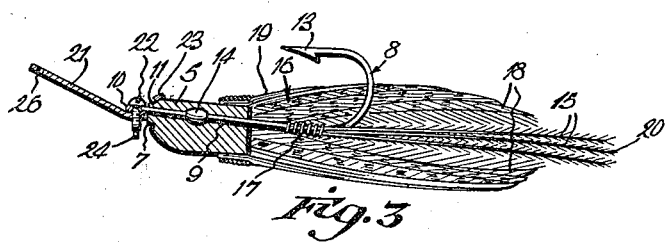
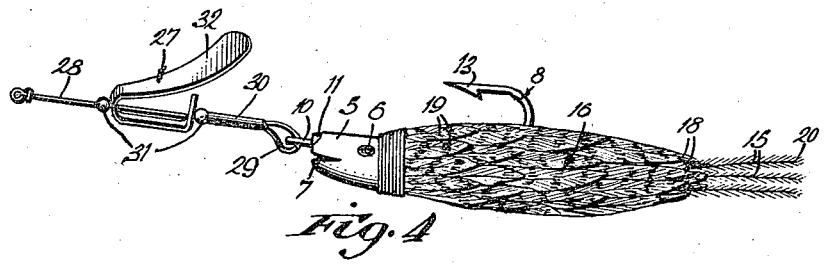

2,013,226

UNITED STATES PATENT OFFICE 2,013,226

ARTIFICIAL FISHING BAIT

Lehn W. Weesner, Cincinnati, Ohio

Original application April 11, 1934, Serial No. 720,018. Divided and this application July 12, 1935, Serial No. 31,120

2 Claims. (Cl. 43—42)

This invention relates to artificial bait for fishing, and is particularly directed to a bait or lure of the character adaptable for casting or trolling. This application is divisional of co-pending application Serial No. 720,018, filed April 11, 1934.

It is an object of the present invention to provide an improved artificial fishing bait or lure which has, to an unusual extent, the appearance of a minnow, and which as moved through the water accurately simulates the action of a minnow, that is, gives the appearance of being alive and swimming, and includes for this purpose a novel arrangement of feathers or their equivalents.

It is a further object of this invention to provide a feathered bait of this character in conjunction with which a device is incorporated in front of the bait which will rotate rapidly as drawn through the water and will accentuate the lifelike appearance of the bait or lure by causing a fluttering, pulsating or dilating action of the feathers graphically representative of the breathing of the minnow and its fin action.

It is a still further object of this invention to provide a bait which is of strong durable construction easily assembled, and in which the parts will not become separated if undue longitudinal strain occurs, tending to pull the bait apart.

These objects have been fulfilled in a novel structure incorporating for these purposes a hook having its shank embedded in a head, hackles of feathers or the like secured to the shank of the hook and the head respectively, these feathers by virtue of their mounting being spaced apart to provide an annular space. This annular space permits freedom of movement of the outer or circumferentially arranged hackle or layer of feathers, whereby they can flutter, pulsate or dilate, giving an excellent simulation of the live minnow in action.

The action of the feathers may be greatly increased by the use of a water driven rotating or spinning device in front of the feathers tending to create a whirling or centrifugal action about the feathers greatly agitating the same.

The structure herein disclosed is extremely effective in view of the fact that the feathers are separated and are not provided in great quantity. Therefore they cannot become matted together to form a dead mass. The circumferentially arranged hackle or layer moves freely in relation to the inner or tail hackle which extends rearwardly beyond the outer layer.

Other objects and further advantages will be more fully apparent from a description of the accompanying drawing, in which:

Figure 1 is a side elevation of the improved bait or lure.

Figure 2 is a top plan view of Figure 1.

Figure 3 is a sectional view taken on line 3—3, Fig. 2, illustrating the details of the construction of the bait and the arrangement of the feathers.

Figure 4 is a view showing the whirling or spinner device used in conjunction with the bait for causing greater action of the feathers.

The artificial bait or lure as disclosed in the drawing is constructed of lead and feathers or the like. The lead formed head 5 of the bait, for the purpose of simulating the head of a minnow, is appropriately decorated with eyes 6 and formed to include a mouth 7. The hook 8 for the bait has a shank 9 passing longitudinally through the head. In other words, the cast head is molded about the shank of the hook.

The eyelet end 10 of the hook is projected through the nose 11 for the purpose of attachment of the bait to the customary fishing line (not shown), or for the attachment of various devices which may be used between the fishing line and the bait of this invention. The rear or barb end 13 of the hook projects outwardly and forwardly in the usual manner.

It is preferable in casting or molding the head about the shank of the hook to incorporate a bead of lead 14 on some sort of protuberance in the shank of the hook, whereby when the lead head is cast about the shank there will be no chance for displacement of the hook, that is to say, longitudinal withdrawal as undue load is thrown on the hook. Various means may be used for preventing this longitudinal displacement, many of which means are well known in the art.

The body of the artificial minnow is preferably formed of two kinds of feathers. The interior feathers 15 may be hackle or chicken feathers, whereas the outer feathers 16 may be duck feathers, preferably mallard. The inner feathers are selected for length and are very slender. The inner group or hackle of feathers is fastened to the hook by means of cord, indicated at 17. The outer hackle of feathers is fastened to the rear peripheral surface of the head or neck portion thereof. These outer feathers are selected and applied in the following manner.

Long feathers 18, not quite as long as the hackle feathers, are first placed around the neck and completely encircle the body thereby circumferentially surrounding the first hackle. Shorter sets of feathers are then applied superimposed on the first, until finally short shoulder feathers 19 are used. It will be seen that this arrangement of feathers permits a great deal of movement and the body of the artificial minnow can dilate or flutter as the bait moves through the water. This action of the feathers can be accentuated or increased by a whirling action imparted from any suitable means placed in front thereof, such as will be described hereinafter.

The arrangement of feathers provides an annular space, and accordingly the outer hackle of feathers or the circumferentially arranged group is generally out of contact with the inner or tail hackle. It will be noted that the inner feathers project out and cause the appearance of the tail as at 20.

It will be noted that the feathers are projected generally longitudinally of the bait and give the appearance of the body of the minnow. Since a space is provided, the outer group takes the position of a layer. Since the space is present, there is no chance for matting or massing of the groups of feathers, which result would be prohibitive to free movement and the true simulation of the minnow.

As shown in Figures 1 to 3 of the drawing, a deflector or wabble disc or plate 21 may be provided in front of the head. This plate and the details thereof are retained as the subject matter of the case from which this application is divided, but for the purpose of a complete description are described herein.

The plate 21 is flat and is inclined forwardly and upwardly. It is fastened to the eyelet by means of a special screw 22 passed loosely through the eyelet and screwed through the tail portion of the plate. The tail portion or rearward extension of the plate includes a bridge portion or strap 23 which lies across the nose of the minnow. This steadies the plate in position on the minnow and prevents any rotation on the screw.

The screw, as stated, is special. It has been found that these screws since they are very tiny and the threads very fine are difficult to place in position. Accordingly, a counter-turned unthreaded pilot tip 24 is provided. This centers the screw in the hole in the plate for insertion and it is readily possible to start the screw without difficulty.

The extension of the disc is apertured as at 25 between the bridge and the screw-threaded aperture, whereby the plate can be inserted over the eyelet of the hook, disposing the plate against the underside of the eyelet with the bridge disposed over the nose of the head. This plate or disc includes an aperture 26 at its forward end for the attachment of a leader or line thereto, whereby the bait can be cast or drawn through the water.

The action of the bait when drawn through the water is sinuous, that is to say, the bait weaves back and forth laterally as a result of the pressure of the inclined plate against the water. This plate elevates the bait or lure tending to keep it fairly close to the surface. It will be appreciated that the bait is weighted by means of the lead head in the preferred use, and would sink deep in the water if it were not for the elevating effect produced by the plate.

As has been stated, means may be incorporated in front of the bait for the purpose of increasing the movement of the feathers. For this purpose a spinner device 27, shown in Figure 4, is attached to the eyelet. A leader 28 forms the rotative or axial support for the spinner device. The wire length constituting the leader has one end bent to provide an eyelet 29 in the end thereof, the support terminal being reversely bent to lie along the length of the leader. A sleeve or tube 30 slidably mounted on the leader is slipped over the extended end thereof for locking the eyelet in position on the fixed eyelet of the bait.

The spinner device is mounted on the leader between balls 31, 31, which facilitate rotation thereof. The spinner is formed of a strip of metal. Its mounted portion is of U-shape with the leader passing through the arms thereof. The forward arm is extended rearwardly in an arc to form a vane 32. The vane is twisted slightly laterally to provide a structure which will whirl or rotate as the spinner is drawn through the water. This spinner device beside creating light flashes which attract the fish, which is the conventional use of the spinner device, causes a whirling action of the water about the bait. This disturbance is effective on the feathers for causing dilation of the circumferentially arranged group.

The action of the feathers, which may be described as fluttering, quivering or pulsating, makes the bait appear to be alive in a true simulation of the minnow since the effect is that of breathing and fin movement.

Having described my invention, I claim:

1. In a lure, the combination of a head, a hook having a shank embedded in the head, a hackle of feathers or the like secured to the shank of the hook at the rear of the head in the plane of the barb and extending rearwardly from the curved portion of the hook, and a second hackle of feathers or the like circumferentially surrounding the first hackle, secured to the rear peripheral surface of the head and forming with the first hackle an annular space, the first hackle extending rearwardly a greater distance than the second hackle.

2. In a lure having a water driven rotatable means at the forward end thereof for creating activity of the water, the combination of a head, a hook having a shank embedded in the head, a hackle of feathers or the like secured to the shank of the hook at the rear of the head in the plane of the barb and extending rearwardly from the curved portion of the hook, and a second hackle of feathers or the like circumferentially surrounding the first hackle and secured to the rear peripheral surface of the head and forming with the first hackle an annular space whereby the activated water will agitate the circumferentially disposed hackle, the said first named hackle being rigidly coaxially secured to the shank of the hook whereby agitation of the water and the outer hackle of feathers by the rotatable means, will be substantially ineffective to cause agitation of the inner hackle of feathers.

LEHN W. WEESNER.